Dec. 29, 1931.   F. B. HALFORD ET AL   1,839,027
VARIABLE SPEED TRANSMISSION MECHANISM
Filed March 19, 1930
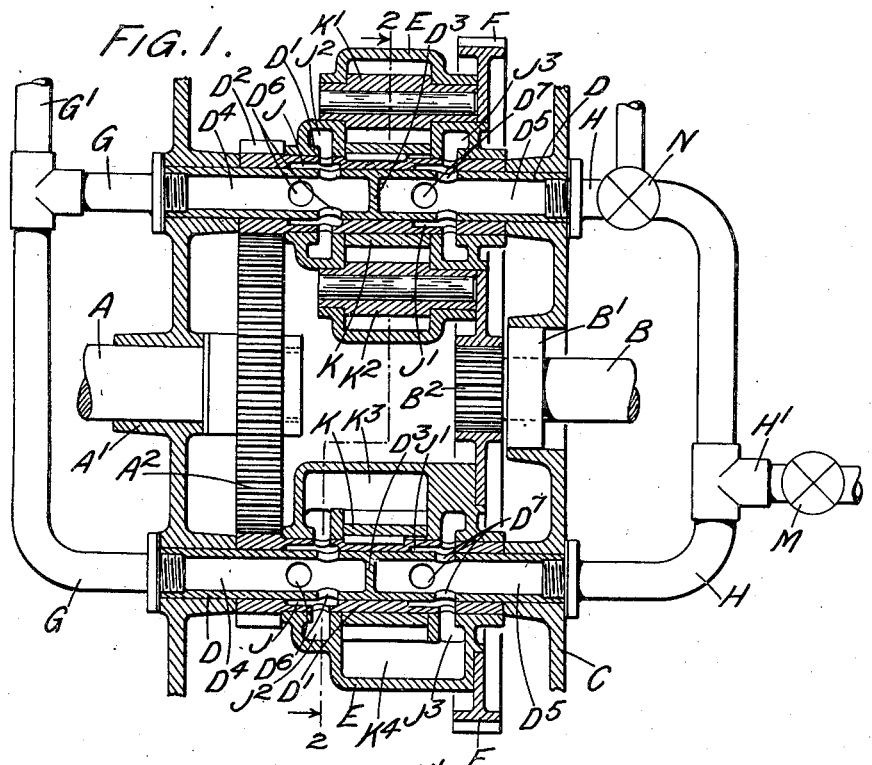
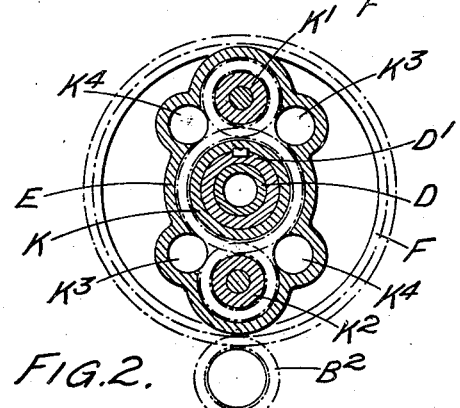
Inventors.
F. B. Halford & W. H. Arscott Patented Dec. 29, 1931

1,839,027

UNITED STATES PATENT OFFICE

FRANK BERNARD HALFORD AND WILLIAM HAMMETT ARSCOTT, OF LONDON, ENGLAND

VARIABLE SPEED TRANSMISSION MECHANISM

Application filed March 19, 1930, Serial No. 437,188, and in Great Britain March 26, 1929.

This invention relates to variable speed transmission mechanism of the kind in which power is transmitted from a main driving member to a main driven member through hydraulic transmission devices functioning as slipping clutches or variable speed gears, such devices being hereinafter referred to for the sake of brevity as hydraulic clutch or variable speed gear devices, and has for its object to provide an improved form of such transmission mechanism, particularly but not exclusively applicable to the driving of supercharging blowers for internal combustion engines or for other purposes where it is desirable that the maximum speed of the main driven member shall be greater or less than that of the main driving member, where the permissible weight or size of the mechanism is limited and where high rotational speeds or the transmission of large powers renders it particularly desirable that forces in the transmission mechanism shall as far as possible be balanced.

To this end variable speed transmission mechanism according to the present invention comprises in combination with main driving and driven members two or more similar hydraulic clutch or variable speed gear devices having driving and driven members rotating about fixed axes, gear wheel or other positive driving connections between the driving members of the hydraulic devices and the main driving member and between the driven members of the hydraulic devices and the main driven member, and an interconnection between the fluid passages of the hydraulic clutch or variable speed gear devices such as to maintain the proportion of power transmitted by such devices evenly distributed between them, means preferably being provided for controlling simultaneously the degree of slip permitted to or the gear ratio of the hydraulic clutch or variable speed gear devices.

The means whereby the drive is transmitted from the main driving member to the hydraulic transmission devices and from these devices to the main driven member may vary, but conveniently comprise gear wheels interposed on the one hand bewteen the main driving member and the transmission devices and on the other hand between these transmission devices and the main driven member so that the drive is transmitted through the transmission devices by way of the gear wheels. With such an arrangement it will be seen that by employing gear wheels of suitable diameters it is possible to obtain a gear ratio as between the main driving and driven members such that when a direct drive is transmitted from the driving member to the driven member of each hydraulic transmission device, i. e. when the driving and driven members of these devices rotate at the same speed, the main driven member will rotate either at a higher or lower speed than the main driving member, In a convenient arrangment the main driving and driven members are arranged coaxially and the hydraulic clutch or variable speed gear devices are arranged with the axes of their driving and driven members parallel to and evenly spaced apart around the axis of the main driving and driven members, the driving and driven members of each hydraulic clutch or variable speed gear device being operatively connected respectively to the main driving and driven members by gear wheels or the like.

The form of the hydraulic clutch or variable speed gear devices employed may vary but preferably each device is in the form of a gear wheel or other pump, the degree of "slip" in which is controlled by controlling the amount of fluid which is permitted to flow through it. In such an arrangement when gear wheel pumps are employed, the driving and driven members of each device are constituted, one by one of the gear wheels, and the other by the pump casing which is rotatable about an axis coincident with that of such gear wheel. Similarly if hydraulic clutch devices of the known reciprocating pump type are employed the driving and driven members are constituted in known manner by the crankshaft or the like and by the crank case and cylinders which are mounted to rotate about the crankshaft axis. In either case the pressure or delivery chambers of the pumps constituting the hydraulic clutch devices are connected by a communicating passage out of which leads a common outflow passage having a valve therein whereby the flow of fluid through the hydraulic clutch devices and hence the degree of "slip" permitted thereto can be controlled simultaneously and to an equal extent. This arrangement ensures that the pressures in the pressure or delivery chambers of the hydraulic clutch devices shall at any moment be the same for all such devices so that the proportion of power transmitted by these devices is evenly distributed between them.

Further, a relief valve is preferably provided in the communicating passage between the delivery or pressure chambers of the hydraulic clutch devices adapted to open automatically if the pressure therein exceeds a predetermined value so as to permit the clutch devices to slip if too great a power tends to be transmitted through the apparatus or if the driven member is subjected to too great a load owing for example to the seizure or breakage of some part.

For example when the invention is applied to apparatus for driving the supercharger of an internal combustion engine, the relief valve may be so set as to open and thus permit the hydraulic clutch devices to slip, when excessive power tends to be delivered through the apparatus owing to rapid acceleration or deceleration of the engine due to sudden opening or closing of the throttle. With such an arrangement the speed of the supercharger, instead of being suddenly increased or decreased with sudden accelerations or decelerations of the engine, will accelerate or decelerate more slowly than the engine and thus follow sudden variations in the engine speed with a certain degree of lag.

When hydraulic clutch devices are employed, the degree of "slip" and hence the relative speeds of the driving and driven members depends in some degree on the speed of the driving member and the load on the driven member. In some cases, however, it may be desirable to have a definite gear ratio between the driving and driven members for a given setting of the control member irrespective of variations in speed or load and in such cases instead of hydraulic clutch devices variable speed gear devices may be employed. Such devices are conveniently of known type comprising a fluid pump connected to the main driving member and delivering fluid to a fluid motor connected to the main driven member, means being provided for varying the effective stroke of the pump or otherwise controlling the quantity of fluid delivered thereby. With such an arrangement, the pressure or delivery chamber of the pumps of the hydraulic variable speed gear devices communicate with a common passage or chamber out of which lead passages through which the fluid flows to the fluid motors. Thus all the motors receive fluid in effect from a common source of fluid pressure whereby each motor is caused automatically to transmit its correct proportion of power to the driven member in spite of small differences in the quantities of fluid delivered by the several pumps, due for example to differences in the efficiencies thereof or in the settings of their individual control members.

In all cases each hydraulic clutch or variable speed gear device is preferably of symmetrical form about its axis of rotation so as to be substantially statically balanced. Thus, in the case where hydraulic clutch devices of the gear wheel pump type are employed as indicated above, each device conveniently comprises a central gear wheel which is connected to the main driving or driven member, meshing with two idle gear wheels disposed on diametrically opposite sides of the central gear wheel so as to form inlet and outlet chambers adjacent to the point where each idle gear wheel meshes with the central gear wheel. These inlet and outlet chambers communicate with inlet and outlet passages disposed coaxially with the axis of rotation of the central gear wheel and pump casing and entering this casing respectively from opposite ends thereof.

The invention may be carried into practice in various ways but one construction according to this invention is illustrated somewhat diagrammatically in the accompanying drawings, in which Figure 1 is a sectional side elevation in the plane in which the axes of the driving and driven members lie, and Figure 2 is a section on the line II—II of Figure 1.

In the construction illustrated the apparatus comprises coaxial main driving and driven shafts A and B supported in bearings $A^1$ and $B^1$ in a casing C. Rotatably supported within the casing C on diametrically opposite sides of the axes of the main driving and driven shafts A and B are two hydraulic clutch devices the axes of rotation of which are parallel to the axes of the main driving and driven shafts.

Each hydraulic clutch device is of the gear wheel pump type and comprises a hollow central spindle D rigidly supported at its ends in the casing C and having mounted on its intermediate part a freely rotatable sleeve $D^1$ rigidly mounted on or formed integral with one end of which is a gear wheel $D^2$ meshing with a gear wheel $A^2$ on the main driving shaft A. Each pump casing E is mounted to rotate freely upon the rotatable sleeve $D^1$ and carries a gear wheel F meshing with a gear wheel $B^2$ on the main driven shaft B. The hollow central spindle D is provided with a transverse partition $D^3$ 6. Variable speed transmission mechanism including in combination coaxial main driving and driven members, at least two similar hydraulic clutches evenly spaced around the axis of the main driving and driven members and each comprising driving and driven members rotating about fixed axes arranged parallel to the axis of the main driving and driven members, a positive driving connection between the main driving member and the driving members of the hydraulic clutches, a positive driving connection between the main driven member and the driven members of the hydraulic clutches, a communicating passage between the pressure chambers of these clutches so as to maintain evenly distributed between them the proportion of power transmitted by such hydraulic clutches from the main driving member to the main driven member, a common outflow passage leading from this communicating passage, and a valve in this common outflow passage whereby the flow of fluid through the several hydraulic clutches and hence the degree of slip permitted thereto can be controlled simultaneously to the same extent.

7. Variable speed transmission mechanism including in combination main driving and driven members, at least two similar hydraulic clutch devices each of the nature of a gear wheel pump comprising driving and driven members, one of which is constituted by a gear wheel and the other by the pump casing, these driving and driven members rotating about a fixed axis, positive driving connections between the driving members of the hydraulic clutches and the main driving member and between the driven members of the hydraulic clutches and the main driven member, and an interconnection between the pressure chambers of the gear wheel pumps such as to maintain evenly distributed between them the proportion of power transmitted thereby from the main driving to the main driven member.

8. Variable speed transmission mechanism including in combination coaxial main driving and driven members, at least two similar hydraulic transmission devices evenly spaced around the axis of the main driving and driven members and each of the nature of a gear wheel pump comprising driving and driven members one of which is constituted by a gear wheel and the other by the pump casing, these driving and driven members rotating about a fixed axis arranged parallel to the axis of the main driving and driven members, positive driving connections between the driving members of the hydraulic clutches and the main driving member and between the driven members of the hydraulic clutches and the main driven member, and a communicating passage between the pressure chambers of the gear wheel pumps constituting the hydraulic clutches such as to maintain evenly distributed between them the proportion of power transmitted thereby from the main driving member to the main driven member.

9. Variable speed transmission mechanism including in combination main driving and driven members, at least two similar hydraulic clutch devices each of the nature of a gear wheel pump comprising driving and driven members, one of which is constituted by a gear wheel and the other by the pump casing, these driving and driven members rotating about a fixed axis, positive driving connections between the driving members of the hydraulic clutches and the main driving member and between the driven members of the hydraulic clutches and the main driven member, a communicating passage between the pressure chambers of the gear wheel pumps such as to maintain evenly distributed between them the proportion of power transmitted thereby from the main driving member to the main driven member, a common outflow passage leading from this communicating passage, and a valve in this common outflow passage whereby the flow of fluid through the several hydraulic clutches and hence the degree of slip permitted thereto can be controlled simultaneously to the same extent.

10. Variable speed transmission mechanism including in combination main driving and driven members, at least two similar hydraulic transmission devices evenly distributed about the axis of the main driving and driven members and each of the nature of a gear wheel pump comprising driving and driven members, one of which is constituted by a gear wheel and the other by the pump casing, these driving and driven members rotating about fixed axes arranged parallel to the axis of the main driving and driven members, positive driving connections between the driving members of the hydraulic clutches and the main driving member and between the driven members of the hydraulic clutches and the main driven member, a communicating passage between the pressure chambers of the gear wheel pumps constituting the hydraulic clutches such as to maintain evenly distributed between them the proportion of power transmitted thereby from the main driving member to the main driven member, a common outflow passage leading from this communicating passage, and a valve in this common outflow passage whereby the flow of fluid through the several hydraulic clutches and hence the degree of slip permitted thereto can be controlled simultaneously to the same extent.

11. Variable speed transmission mechanism including in combination main driving and driven members, two or more similar hydraulic clutches each of the nature of a pump of the gear wheel type comprising driving and driven members one of which is constituted by a central gear wheel and the other by the pump casing, and at least two diametrically opposite idle gear wheels meshing with the central gear wheel, positive driving connections between the driving members of the hydraulic clutches and the main driving member and between the driven members of the hydraulic clutches and the main driven member, and a communicating passage between the pressure chambers of the gear wheel pumps such as to maintain evenly distributed between them the proportion of power transmitted thereby from the main driving member to the main driven member.

12. Variable speed transmission mechanism including in combination main driving and driven members, two or more similar hydraulic clutches of the nature of pumps of the gear wheel type comprising driving and driven members one of which is constituted by a central gear wheel and the other by the pump casing, and at least two diametrically opposite idle gear wheels meshing with the central gear wheel, the central gear wheel and casing being rotatable about a fixed axis parallel to the axis of the main driving and driven members, positive driving connections between the driving members of the hydraulic clutches and the main driving member and between the driven members of the hydraulic clutches and the main driven member, and a communicating passage between the pressure chambers of the gear wheel pumps such as to maintain evenly distributed between them the proportion of power transmitted thereby from the main driving member to the main driven member.

13. Variable speed transmission mechanism including in combination main driving and driven members, at least two similar hydraulic transmission clutches of the nature of pumps including driving and driven members rotating about fixed axes, positive driving connections between the driving members of the clutches and the main driving member and between the driven members of the clutches and the main driven member, a communicating passage between the pressure chambers of the hydraulic clutches so as to maintain evenly distributed between them the proportion of power transmitted by such clutches from the main driving member to the main driven member, and a relief valve in the communicating passage adapted to open automatically if the pressure therein exceeds a predetermined value.

14. Variable speed transmission mechanism including in combination main driving and driven members, at least two similar hydraulic transmission clutches of the nature of pumps including driving and driven members rotating about fixed axes, positive driving connections between the driving members of the clutches and the main driving member and between the driven members of the clutches and the main driven member, a communicating passage between the pressure chambers of the hydraulic clutches such as to maintain evenly distributed between them the proportion of power transmitted by such clutches from the main driving member to the main driven member, a common outflow passage leading from this communicating passage, a valve in this common outflow passage whereby the flow of fluid through the several hydraulic clutches and hence the degree of slip permitted thereto can be controlled simultaneously to the same extent, and a relief valve in the communicating passage adapted to open automatically if the pressure therein exceeds a predetermined value.

15. Variable speed transmission mechanism including in combination coaxial main driving and driven members, at least two similar hydraulic transmission devices evenly spaced around the axis of the main driving and driven members, and each of the nature of a gear wheel pump and comprising driving and driven members, one of which is constituted by a gear wheel and the other by the pump casing, these driving and driven members rotating about fixed axes arranged parallel to the axis of the main driving and driven members, positive driving connections between the driving members of the hydraulic clutches and the main driving member and between the driven members of the hydraulic clutches and the main driven member, a communicating passage between the pressure chambers of the gear wheel pumps constituting the hydraulic clutches such as to maintain evenly distributed between them the proportion of power transmitted thereby from the main driving member to the main driven member, and a relief valve in the communicating passage adapted to open automatically if the pressure therein exceeds a predetermined value.

16. Variable speed transmission mechanism including in combination coaxial main driving and driven members, at least two hydraulic transmission devices each of the nature of a gear wheel pump comprising driving and driven members one of which is constituted by a central gear wheel and the other by the pump casing, and two idle gear wheels rotatably mounted in the pump casing and each engaging the central gear wheel, a rigid support, bearings in this support on which the pump casings can rotate about the axis of the central gear wheels of such pumps, gear wheels on the driving and driven members of the hydraulic clutches and gear wheels on the main driving and driven members meshing with such gear wheels.

In testimony whereof we have signed our names to this specification.

FRANK BERNARD HALFORD.
WILLIAM HAMMETT ARSCOTT.